(12) United States Patent
Park

(10) Patent No.: US 12,433,369 B2
(45) Date of Patent: Oct. 7, 2025

(54) DOT BONDING SHOE INSOLE USING ADHESIVE RESIN MIXED WITH HYDROPHOBIC NANO-SILICA AND MANUFACTURING THEREOF

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 0 days.

(21) Appl. No.: 18/124,035

(22) Filed: Mar. 21, 2023

(65) Prior Publication Data

US 2023/0218041 A1 Jul. 13, 2023

Related U.S. Application Data

(62) Division of application No. 17/010,824, filed on Sep. 3, 2020, now Pat. No. 11,882,900.

(30) Foreign Application Priority Data

Feb. 19, 2020 (KR) .......................... 10-2020-0020170

(51) Int. Cl.
*A43B 17/00* (2006.01)
*A43B 17/10* (2006.01)
(Continued)

(52) U.S. Cl.
CPC .......... *A43B 17/107* (2013.01); *A43B 17/006* (2013.01); *A43D 8/02* (2013.01);
(Continued)

(58) Field of Classification Search
CPC ......... A43B 1/0063; A43B 1/02; A43B 1/028; A43B 1/04; A43B 1/05; A43B 1/14; A43B 17/006; A43B 17/107; A43B 17/14; A43D 8/00; A43D 8/02; A43D 8/04; A43D 25/00; A43D 25/18; A43D 25/181; A43D 25/185; B29C 65/48; B29C 65/4805;
(Continued)

(56) References Cited

U.S. PATENT DOCUMENTS 8,173,737 B2 * 5/2012 Scholz ..................... C09J 11/04
524/588
2018/0361676 A1* 12/2018 Topper ................ B29C 65/4815

FOREIGN PATENT DOCUMENTS

KR 2009007099 A * 1/2009
KR 10-2011-0009617 A 1/2011
(Continued)

*Primary Examiner* — Michael A Tolin
(74) *Attorney, Agent, or Firm* — Goldilocks Zone IP Law

(57) ABSTRACT

A present invention related to a method for manufacturing a dot bonding shoe insole using an adhesive resin containing hydrophobic nano-silica, including:
melting adhesive resin made of any one selected from thermoplastic polyurethane (TPU) or ethylene vinyl acetate (EVA) containing hydrophobic nano-silica in the range of 0.2 to 5 phr and applying to the surface of the transfer roller in which the intaglio dot pattern is formed in a mesh shape in the shape of the shoe insole;
removing the adhesive resin applied other area than the intaglio dot pattern of the surface of the transfer roller;
transferring the adhesive resin applied to the intaglio dot pattern of the surface of the transfer roller to either one of the foam or the fabric;
bonding the foam and the fabric by compressing; and
cutting a shoe insole shape in a package in which the foam and the fabric are bonded.

7 Claims, 4 Drawing Sheets

(51) Int. Cl.
- *A43D 8/02* (2006.01)
- *A43D 25/18* (2006.01)
- *B29C 65/48* (2006.01)
- *B29D 35/14* (2010.01)
- *B29L 31/50* (2006.01)
- *B32B 5/24* (2006.01)
- *B32B 7/14* (2006.01)
- *B32B 37/00* (2006.01)
- *B32B 37/12* (2006.01)
- *C08K 3/36* (2006.01)
- *C08K 9/04* (2006.01)

(52) U.S. Cl.
CPC ........ *A43D 25/181* (2013.01); *B29C 65/4815* (2013.01); *B29D 35/142* (2013.01); *B32B 5/245* (2013.01); *B32B 7/14* (2013.01); *B32B 37/0053* (2013.01); *B32B 37/0076* (2013.01); *B32B 37/1292* (2013.01); *C08K 3/36* (2013.01); *C08K 9/04* (2013.01); *B29L 2031/507* (2013.01); *B32B 2037/1215* (2013.01); *B32B 2264/1021* (2020.08); *B32B 2305/022* (2013.01); *B32B 2305/18* (2013.01); *B32B 2437/02* (2013.01); *C08K 2201/011* (2013.01)

(58) Field of Classification Search
CPC ... B29C 65/481; B29C 65/4815; B29C 66/45; B29D 35/122; B29D 35/142; B29L 2031/507; B32B 5/02; B32B 5/022; B32B 5/024; B32B 5/026; B32B 5/18; B32B 5/245; B32B 7/12; B32B 7/14; B32B 37/0053; B32B 37/0076; B32B 37/12; B32B 37/1207; B32B 37/1284; B32B 37/1292; B32B 2037/1215; B32B 38/0004; B32B 38/04; B32B 2038/042; B32B 2250/02; B32B 2264/1021; B32B 2266/0221; B32B 2266/0278; B32B 2305/00; B32B 2305/022; B32B 2305/18; B32B 2305/182; B32B 2305/186; B32B 2305/188; B32B 2307/732; B32B 2437/00; B32B 2437/02; B32B 2439/06; C08G 18/3206; C08G 18/42; C08G 18/48; C08G 18/72; C08K 3/36; C08K 9/04; C08K 9/06; C08K 2201/011; C09J 5/00; C09J 123/0853; C09J 175/04; C09J 175/06; C09J 175/08; C09J 201/00; C09J 2203/362; C09J 2301/204; C09J 2301/408; C09J 2423/04; C09J 2431/00; C09J 2475/00

See application file for complete search history.

(56) References Cited

FOREIGN PATENT DOCUMENTS

| | | | | |
|---|---|---|---|---|
| KR | 10-1203629 B1 | 11/2012 | | |
| KR | 2016005227 A | * | 1/2016 | ............. B29D 35/04 |
| KR | 10-2016-0046626 A | 4/2016 | | |
| KR | 10-2016-0118732 A | 10/2016 | | |
| KR | 10-1760577 B1 | 7/2017 | | |
| KR | 10-1905957 B1 | 10/2018 | | |
| KR | 10-1915407 B1 | 11/2018 | | |
| KR | 10-1938526 B1 | 1/2019 | | |
| KR | 1938526 B1 | * | 1/2019 | ............. C08G 18/04 |
| KR | 10-2057036 B1 | 12/2019 | | |
| KR | 10-2131606 B1 | 7/2020 | | |
| WO | WO-2013165063 A1 | * | 11/2013 | ........... A43B 3/0078 |

\* cited by examiner

【FIG. 1】
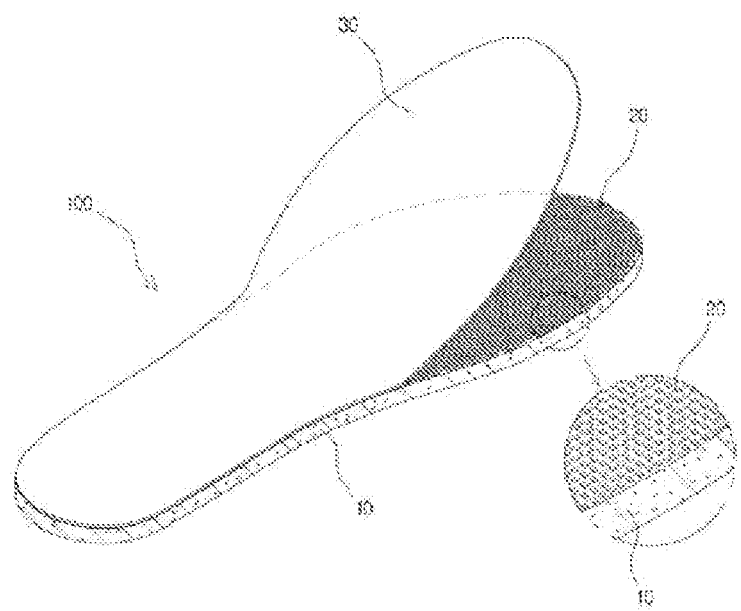
【FIG. 2】
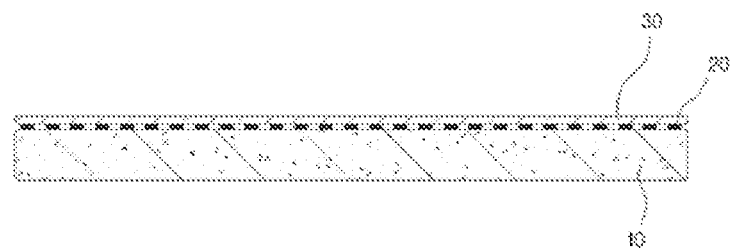

[FIG. 3]
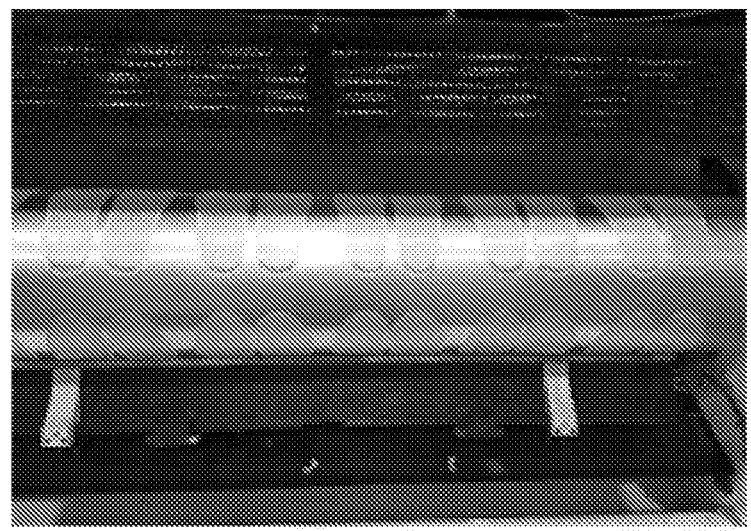
[FIG. 4]
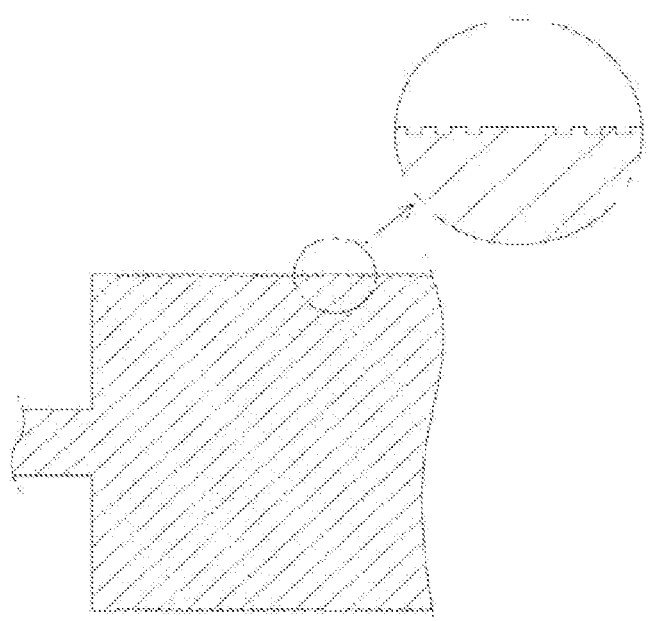

[FIG. 5]
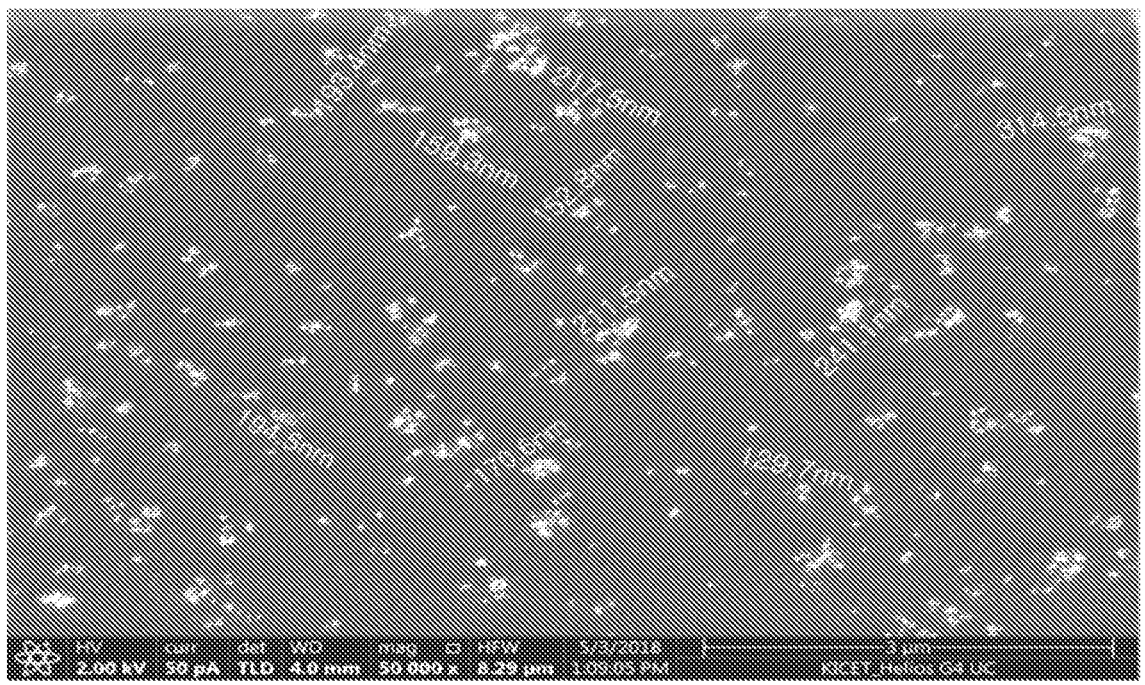
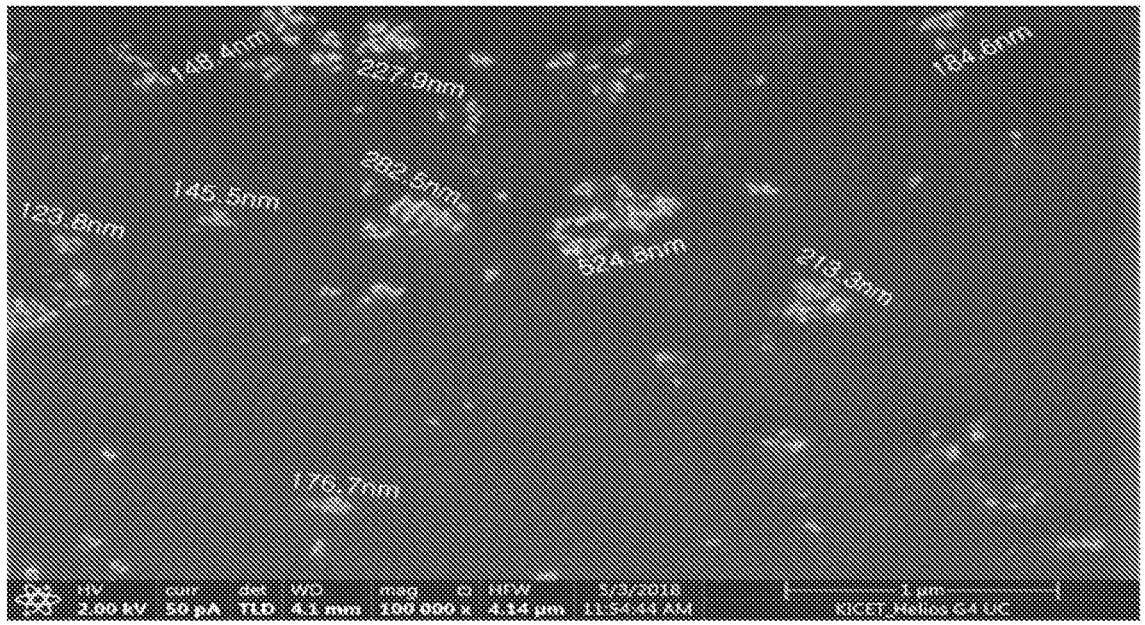

FIG. 6
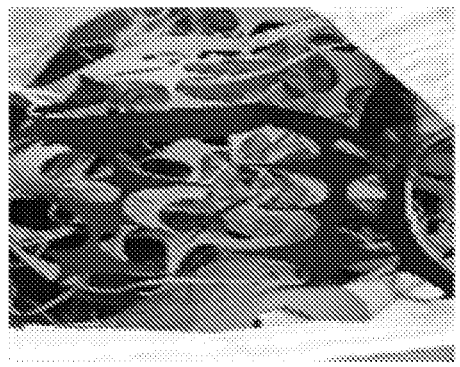
Scrap generated by conventional method
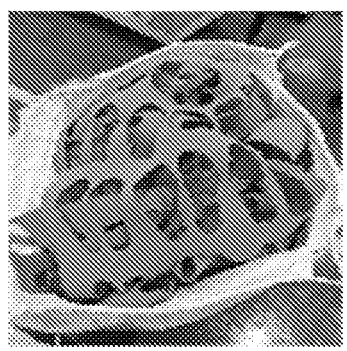 
scrape generated by methods of the present invention

DOT BONDING SHOE INSOLE USING ADHESIVE RESIN MIXED WITH HYDROPHOBIC NANO-SILICA AND MANUFACTURING THEREOF

CROSS-REFERENCE TO RELATED APPLICATION

This application is a Divisional application, pursuant to the provisions of 35 U.S.C. § 120, of prior U.S. patent application Ser. No. 17/010,824 titled "DOT BONDING SHOE INSOLE USING ADHESIVE RESIN MIXED WITH HYDROPHOBIC NANO-SILICA AND MANUFACTURING THEREOF" by Heedae PARK, filed on Sep. 3, 2020, now U.S. Pat. No. 11,882,900, and claims priority to Korean Patent Application No. 10-2020-0020170, filed on Feb. 19, 2020, and all the benefits accruing therefrom under 35 U.S.C. § 119, the contents of which in its entirety are herein incorporated by references.

TECHNICAL FIELD

Aspect(s) of the present invention relates to a dot-bonding shoe insole using an adhesive resin containing hydrophobic nano-silica and a method for manufacturing the same, more specifically, by applying a hydrophobic nano-silica-coated adhesive resin in a dot pattern, the foam and fabric are bonded to show a soft texture while reducing product weight and material cost. In addition, aspect(s) of the present invention relates to a dot-bonding shoe insole and a method for manufacturing the shoe using an adhesive resin containing hydrophobic nano-silica that can be easily separated and recycled by scrapping the generated scrap after cutting the shoe insole shape.

BACKGROUND TECHNOLOGY

In general, various shoes such as sneakers, hiking shoes, etc., may include an upper leather that forms the appearance of shoes, an outsole in contact with the ground, a midsole installed on the upper side of the out sole, and an insole that comes in contact with the user's foot.

At this time, the insole is installed on the inner bottom surface of the shoe, and is configured to alleviate the impact force transferred from the ground to the sole during walking; therefor improving fit and hygiene.

Various functions are added to the shoe insole as described above, based on research results that the health of the foot is a very important factor for the human body.

For example, insoles are molded into an ergonomic structure that can effectively absorb shock, or materials that have been developed to improve sweat absorption, antibacterial and deodorizing functions.

Recently, a technology has been proposed to prevent frostbite in the winter season by providing a heating function with a built-in heating wire in the shoe insole.

On the other hand, the insole may be manufactured in a foam shape by foam molding such as Polyurethane (PU), Ethylene-vinyl acetate (EVA), Polyethylene (PE), and Latex materials.

They are usually bonded with a fabric woven from natural or artificial fibers using an adhesive or a hot melt film.

This bonding process has an advantage of applying the adhesive in the liquid state to the adherend and then bonding the fabric to each other in which solvent or moisture is volatilized through drying, thereby reducing a processing time and a workforce compared to the conventional sewing process.

However, in order to maximize cost reduction, instead of using a liquid adhesive, the process of bonding the fabric with a heat press using a thermoplastic hot melt film is frequently applied.

The thermoplastic hot melt film is widely used for environmentally friendly properties, convenience, and cost efficiency in the industrial fields such as shoes, clothing, and bags.

Thermoplastic resin films of various materials may be used, such as thermoplastic polyurethane (TPU), polyamide, ethylene vinyl acetate (EVA), polyester, etc.

Such thermoplastic hot melt film has good extrusion workability, is good in productivity, does not use a solvent, is not only environmentally friendly, but also has excellent adhesion and good texture.

However, since the conventional thermoplastic hot melt film is usually manufactured to a thickness of 0.2 mm or more in order to secure a stable adhesive force, when the hot melt film is sandwiched between fabrics and subjected to No-Sew Press, an overflow phenomenon frequently occurs. In addition, the fabric product is not only a lot of feeling that the overall weight is heavy, but also feels harder, and there is a disadvantage that does not meet the development trend of lighter weigh fabric.

In particular, the conventional hot-melt-films have the problem of having a thick film thickness of 0.2 mm or more. In addition to this problem, when no-sew pressing is performed in a state in which the thermoplastic hot-melt film is inserted between fabrics, a problem arises in that an excessive amount of the hot-melt film flows into the fabric having a relatively large hole diameter and the hot-melt film is not present at the adhesive interface, eventually causing adhesive failure.

Namely, if a fabric having a relatively large hole diameter is adhered to a fabric having a relatively small hole diameter, a fabric having a relatively high yarn density is adhered to a fabric having a relatively low yarn density, or different kinds of fabrics are adhered to each other by a hot-melt film, the hot-melt film is excessively penetrated into one side of the fabrics by heat and pressure. This means that, the hot-melt film melts and flows into the fabric having a relatively large hole diameter or a relatively low yarn density, and thus the hot-melt film does not remain on the remaining adhesive interface of the fabric.

In order to solve the problem of the above-mentioned foam and fabric bonding method, the inventor of present invention has developed a polyurethane foam skin that can replace the fabric for insoles and then adhered it to the upper portion of the polyurethane foam for insoles for shoes to produce a better cushion feeling in Korean Patent No. 10-1760577, a manufacturing method was developed for an insoles for shoes that may improve cushion feeling, prevent slippage, and also maintain a comfortable state for a long time due to excellent sweat absorption even when worn for a long time.

In Korean Patent No. 10-1905957, using a polyester polyol with a number average molecular weight of 4,000 or more, Aliphatic isocyanate and amine are used as chain extenders, Ethoxylated polypropylene oxide is used as a surfactant, and using rosin as an tackifier, preparing polymerized water-soluble polyurethane adhesive by reacting them, a method of manufacturing a polyurethane hot-melt film having an adhesive function by coating the hot-melt film with the polymerized water-soluble polyurethane adhesive, which is a thickness of 20 µm or less, was proposed.

In Korean Patent No. 10-1915407, a reactive hot melt polyurethane resin composition, which include Polyurethane resin, nano silica, Dimethylhydrazine (DMP) type isocyanate blocking agent; and 2,4-pentanedione is disclosed.

The technologies are disclosed Korean Patents 10-1905957 and 10-1915407, respectively.

In addition, Korean Patent No. 10-1938526, invented by the inventor of the present invention, by using a thermoplastic hot melt film for shoes, the hot melt film comprising a resin, wherein the resin composition is any one resin selected from thermoplastic polyurethane (TPU), ethylene vinyl acetate (EVA), polyamide (Polyamide), polyester (Polyester), the resin includes 0.1 to 5.0 phr nano-silica, the thermoplastic hot melt film does not biased to one side of the fabric by heat and pressure even when the yarn density of fabric is high or low during no-sew press or the diameter of fabric weaving hole is big or small. It has been found that the adhesive force of the hot melt film can be increased by allowing it to be uniformly distributed on the fabric surface without melting.

Furthermore, through patent No. 10-2057036, a hydrophobic nano-silica mixed thermoplastic hot melt film has been developed.

On the other hand, according to an aspect of the present invention, when manufacturing a shoe insole by full surface bonding method using a hot melt film or a liquid adhesive, as a result of earnest research on the method of applying liquid adhesive resin to improve the problem that about 35 to 40% of scrapes among raw materials are discarded, using a transfer roller, the hydrophobic nano-silica coated adhesive resin is applied in a dot pattern and bonded with foam and fabric to prevent overflow and reduce the weight and save material cost of the product while exhibiting a soft touch. In addition, it was confirmed that the scrap generated after cutting the shoe insole shape can be easily separated respective foam and fabric material and recycled.

RELATED DOCUMENTS

Patent Documents

Patent Document 1: Korean Patent No. 10-1760577, entitled "Manufacturing method for footwear insole" dated on Jul. 17, 2017;
Patent Document 2: Korean Patent No. 10-1905957, entitled "Polyurethane hot-melt film and the manufacture Method" dated on Oct. 1, 2018;
Patent Document 3: Korean Patent No. 10-1915407, entitled "composition of hot melt film," dated on Oct. 30, 2018;
Patent Document 4: Korean Patent No. 10-1938526, entitled "Thermoplastic hot-melt film with excellent adhesive strength blended with nano silica," dated on Jan. 8, 2019; and
Patent Document 5: Korean Patent No. 10-2057036, entitled "Thermoplastic hot-melt film with excellent adhesive strength mixed with hydrophobic nano silica," dated on Dec. 12, 2019.

DESCRIPTIONS OF THE INVENTION

Problems to be Solved

An object of the present invention is to provide excellence in adhesion performance by preventing the overflow phenomenon by applying adhesive resin containing hydrophobic nano-silica in a dot pattern using a transfer roller to bond the foam and the fabric.

In addition, another object of the present invention is to provide a dot-bonded shoe insole using a resin adhesive with hydrophobic nano-silica. This can reduce the weight and material cost of the product while ensuring uniform adhesion strength, superior durability, and show a soft texture than conventional products, even if a thinner adhesive resin, 10~40/µM, is applied.

According to aspect(s) of the present invention, by transferring and compressing the adhesive resin, which is applied to the surface of the transfer roller in which the intaglio dot pattern is formed in a mesh shape, to one of a foam and a fabric, a scrap, which is generated after cutting the shoe insole shape can be easily separated into respective foam and fabric and recycled the same. This process may provide a method for manufacturing dot patterned shoe insole using an adhesive resin containing hydrophobic nano-silica which is environmentally friendly because the scrap generated after cutting the shoe insole shape can be easily separated with a foam and a fabric and recycled.

Means for Solving the Problem

The dot bonding shoe insole using the adhesive resin containing the hydrophobic nano-silica according to an aspect of the present invention, the shoe insole formed by bonding the foam and fabric using an adhesive resin applied to an intaglio dot pattern formed transfer roller, the adhesive resin applied to the intaglio dot pattern of the transfer roller surface is integrally molded by being transferred to one of the foam and the fabric, and the adhesive resin is selected from any one of ethylene vinyl acetate (EVA) and a thermoplastic polyurethane (TPU), which contains hydrophobic nano-silica in a range of 0.2 to 5 phr.

According to a preferred embodiment of the present invention, the hydrophobic nano-silica may include any one or more hydrophobic functional groups selected from alkyl groups, dimethyl groups, trimethyl groups, dimethyl siloxane groups, methacryl groups on the surface of the nano-silica particles.

The nano-silica has a primary particle size of 1 to 100 nm, which forms nano-silica aggregates in an adhesive resin, but has an aggregate size within an average of 100 to 1200 nm.

In addition, the intaglio dot pattern formed on the surface of the transfer roller is a mesh shape, i.e., a mesh-type, and the dot transferred to any one of the foam 10 and the fabric 30 has a thickness (height) in a range of 10 to 40 µm, a height and a width in a range of 0.05~0.3 mm, respectively, and space between dots in a range of 0.05~0.15 mm.

The transfer region of the adhesive resin 20 may be formed in a range of 20 to 60% based on the total surface area.

In addition, the manufacturing method of the dot composite shoe insole 100 using the adhesive resin 20 mixed with a hydrophobic nano-silica of the present invention may include the following steps.

A first step of melting the adhesive resin 20 made of any one selected from thermoplastic polyurethane (TPU) or ethylene vinyl acetate (EVA) containing hydrophobic nano-silica in the range of 0.2 to 5 phr and applying it to the surface of the transfer roller in which the intaglio dot pattern is formed in a mesh shape.

A second step of removing the adhesive resin applied to the surface of the transfer roller other than the intaglio dot pattern by using a scraper.

A third step of transferring the adhesive resin applied to the intaglio dot pattern on the surface of the transfer roller to either one of the foam and the fabric.
a fourth step of compressing and bonding the foam and fabric; and
a fifth step of cutting the shape of the shoe insole in the package in which the foam and the fabric are bonded.

Effects of the Invention

The dot bonding shoe insole of the present invention may include nano-silica containing a hydrophobic functional group in an adhesive resin to improve dispersibility in the adhesive resin, improve water resistance, and increase tensile strength.

In addition, the adhesive resin is applied to any one of a foam and fabric in a dot pattern using a transfer roller and is molded to prevent overflow, thereby providing excellent adhesive performance.

Even if a thin adhesive resin, for example, 10~40 μm, is applied, it has the effect of ensuring uniform adhesion strength, superior durability, reduction in a weight of the product, and reduction in material cost, while maintaining uniform adhesion strength and superior durability.

According to aspect(s) of the present invention, a manufacturing method for the dot bonded shoe insole may remove the adhesive resin applied other than area of intaglio dot pattern among the adhesive resin applied to the surface of the transfer roller, then intaglio dot pattern is formed in a mesh shape in the shoe insole shape. By transferring the adhesive resin applied to the surface of the transfer roller to one of the foam and fabric and pressing it, the 35% to 40% scrap generated after cutting the shoe insole shape is easily separated into respective a foam and a fabric. Thus, it can be easily separated and recycled, so it is eco-friendly and has the advantage of cost reduction.

BRIEF DESCRIPTIONS OF DRAWINGS

FIG. 1 is an exploded perspective view of a dot bonding shoe insole according to an aspect of the present invention.
FIG. 2 is a side cross-sectional view of a dot bonding shoe insole according to an aspect of the present invention.
FIG. 3 is a picture of the transfer roller used in the present invention.
FIG. 4 is a side cross-sectional view of the transfer roller according to an aspect of the present invention.
FIG. 5 is a SEM photograph of the surface of the thermoplastic polyurethane coated yarn according to an aspect of the present invention.
FIG. 6 shows scraps according to conventional method and method of according to an aspect of the present invention.

DETAILED DESCRIPTIONS OF THE EMBODIMENTS

Hereinafter, with reference to the drawings, a description will be given of a dot bonding shoe insole using an adhesive resin containing hydrophobic nano-silica according to the present invention and a method of manufacturing the same.

This is intended to illustrate the extent to which a person of ordinary skill in the art to which the present invention pertains can easily implement the invention, and thereby does not mean that the technical spirit and scope of the present invention are limited.

The term "nano-silica" used in the present invention refers to silica particles having a size of primary particles of less than 100 nanometers (nm) or smaller than micro (μm) units.

"Nano-silica" containing a hydrophobic functional group on the surface means that a functional group having hydrophobicity is introduced on a part or all of the surface of the nano-silica particle, hydrophobic nano-silica.

The surface of the conventional nano-silica particles has hydrophilicity, and the nano-silica of the present invention is excellent in dispersibility because a hydrophobic functional group (lipophilic) is introduced through a separate surface treatment (or surface modification) to make the surface hydrophobic. Thus, the water resistance of the thermoplastic adhesive resin itself is reinforced to increase the tensile strength.

In addition, 'nano-silica aggregate', which means that nano-silica primary particles are made up of a plurality of groups, referring to a state in which about 70% or more of nano-silica primary particles are strongly aggregated by physical and chemical action.

These nano-silica aggregates are in a state of being difficult to further separate into smaller entities (nano-silica particles) in the adhesive resin.

Accordingly, a dot bonding shoe insole 100 using a hydrophobic nano-silica adhesive resin 20 according to aspect(s) of the present invention may include: bonding a foam 10 and a fabric 30 using the adhesive resin 20 by applying to the transfer roller on which the intaglio dot pattern is formed, the adhesive resin 20 applied to the intaglio dot pattern among the surfaces of the transfer roller is transferred to any one surface of the foam 10 and the fabric 30 to be integrally molded, and the adhesive resin 20 is made of any one selected from thermoplastic polyurethane (TPU) containing hydrophobic nano-silica in the range of 0.2 to 5 phr or ethylene vinyl acetate (EVA).

In addition, the hydrophobic nano-silica may include one or more hydrophobic functional groups selected from alkyl groups, dimethyl groups, trimethyl groups, dimethyl siloxane groups, and methacryl groups on the surface of the nano-silica particles.

The nano-silica has a primary particle size of 1 to 100 nm, which forms nano-silica aggregates in an adhesive resin, but has an aggregate size within an average of 100 to 1200 nm.

As shown in FIGS. 1 and 2, the intaglio dot pattern formed on the surface of the transfer roller is in a form of mesh shape, the dot, transferred to any one surface of the foam 10 and the fabric 30, has a thickness (height) in a range of 10~40/μM, a width and a length in a range of 0.05~0.3 mm, respectively, a space between dots in a range of 0.05~0.15 mm, and a transfer area of the adhesive resin 20 is formed in a range of 20~60% based on the total surface area.

According to aspect(s) of the present invention, by using an thermoplastic adhesive resin 20 selected from thermoplastic polyurethane (TPU) or ethylene vinyl acetate (EVA) containing the hydrophobic nano-silica in a range of 0.2~5 Parts per Hundred Resin (phr), when bonding the foam 10 and the fabric 30 with a press operation (No Sew Press), even if the tissue density of the foam 10 or the fabric 30 is high or low, or the weaving hole size is large or small it is intended to implement a dot bonding shoe insole using the thermoplastic adhesive resin 20, which can improve adhesion by distributing uniformly on the surface of the fabric 30 without being melted by being biased to one side thereof by heating and pressure.

To accomplish this, the adhesive resin 20 applied to the intaglio dot pattern of the transfer roller surface is transferred to any one of the foam 10 or the fabric 30 and is integrally molded.

The adhesive resin 20 used in the present invention may be uniformly distributed on the surfaces of the foam 10 and the fabric 30 so that there is no problem in an adhesion strength as well as a adhesion performance.

It is possible to secure an adhesive strength equal to or higher than that of the existing one even if the thickness is thinner than the thickness of the conventional thermoplastic hot melt film or liquid adhesive (50 μm or more).

When the hydrophobic functional group is introduced on the surface of the nano-silica particles contained in the adhesive resin 20 according to aspect(s) of the present invention, it was confirmed that the dispersibility of the nano-silica was improved, the hydrophobic action enhanced the water resistance of the adhesive resin 20, and increase in the tensile strength the physical properties such as molding properties are improved.

The hydrophobic functional group that can be introduced to the surface of the nano-silica particles may be any one of an alkyl group, a dimethyl group, a trimethyl group, a dimethyl siloxane group, a methacryl group, and etc.

For example, the nano-silica particles used in the adhesive resin 20 of the present invention may include a dimethyl group on the surface of the nano-silica particles by treating the nano-silica obtained by controlling the temperature and pressure in a fumed silica manufacturing process with an organosilane compound.

It is preferable that the nano-silica particles in which the hydrophobic functional groups are introduced have an OH group density of 1.0 $OH/nm^3$.

The density of the OH group can be measured by a known method, such as measuring the molar absorbance, £, of the OH stretching oscillation band in the organosilanol group at 3750 $cm^{-1}$ using IR spectroscopy by reacting nano-silica particles and lithium aluminium hydride with hydrophobic actuators.

The nano-silica particles into which the hydrophobic functional groups are introduced are present in the nano-silica aggregate state, and the hydrophobic nano-silca particles are dispersed in the aggregate state, which is difficult to separate separately in the resin composition for the hot melt film according to an aspect of the present invention. Preferably, the aggregates have an aggregate size of 100 to 1200 nm, more preferably have an aggregate size of 200 to 500 nm.

If the size of the hydrophobic nano-silica aggregate is 100 nm or more, nano-silica is well dispersed. However, if it exceeds 1200 nm, the thickening effect is reduced, and many defects such as cutting occur in the molding process using a T-die extruder.

The size of the nano-silica aggregate indicates a length in a long axis direction of the nano-silica aggregate and can often be measured using a transmission electron microscope or the like.

As an example, in a FIG. 5, Photo shows a surface of a 0.15 mm thick TPU hot melt film containing a primary particle size of about 20 nm and 1 phr of hydrophobic nano-silica containing a dimethyl group as a hydrophobic functional group (measured by SEM.)

It is shown that the nano-silica in the TPU resin is well dispersed in a form of nano-silica aggregates having a certain size.

As described above according to aspect(s) of the present invention, in order to improve the adhesive strength and formability of the adhesive resin 20, an adhesive resin 20 containing nano-silica containing hydrophobic functional groups on the surface is prepared.

The adhesive resin 20 contains the hydrophobic nano-silica in a range of 0.2 to 5 Parts per Hundred Resin(phr), and the intaglio dot pattern formed on the surface of the transfer roller is a mesh-type, The dot transferred to any one surface of the foam 10 and the fabric 30 has a thickness (height) in a range of 10 to 40 μm, a width and a length in a range of 0.05 to 0.3 mm, an interval between dots in a range of 0.05 to 0.15 mm, and the adhesive resin 20 is formed in a area in a range of 20 to 60% based on the total surface area, so that the foam 10 and the fabric 30 can maintain sufficient adhesion to each other.

In addition, the adhesive performance is excellent by preventing the overflow phenomenon of the adhesive resin 20 that may be generated in the packaging process of bonding by compressing the foam 10 and the fabric 30.

In addition, even if the adhesive resin 20 with a thinner thickness, in a range of 10 to 40 μm, is applied, it has the advantage of securing a uniform adhesive strength, having excellent durability, exhibiting a soft texture, and reducing the weight and material cost of the product than the conventional product.

On the other hand, the thermoplastic polyurethane (TPU) used in an aspect of the present invention is obtained by polymerizing polyols and isocyanates as raw materials and low molecular weight glycols as chain extenders, Examples of the polyol used herein may include polyester glycol, polyether glycol, polycaprolactone, and the like.

Examples of the isocyanate include aromatic isocyanate, aliphatic isocyanate, and the like, Examples of low molecular weight glycols are 1,4-butanediol and the like.

In addition, ethylene vinyl acetate (EVA), polyamide, polyester resin, and etc. can be used as the adhesive resin material.

However, it has been concluded that the use of a resin composition selected from thermoplastic polyurethane (TPU) and ethylene vinyl acetate (EVA) is more effective for kneading, dispersion, and adhesion performance with hydrophobic nano-silica according to an aspect of the present invention.

A manufacturing method of the dot bonding shoe insole 100 using a hydrophobic nano-silica mixed adhesive resin 20 according to an aspect of the present invention may include the following processes:

A first process applying melt adhesive resin 20 made of any one selected from thermoplastic polyurethane (TPU) or ethylene vinyl acetate (EVA) containing hydrophobic nano-silica in a range of 0.2 to 5 phr to a surface of the transfer roller in which intaglio dot pattern in a mesh shape formed in a shape of the shoe insole;

The second process of removing the adhesive resin 20 applied to the surface of the transfer roller other than the intaglio dot pattern by using a scraper;

A third process of transferring the adhesive resin 20 applied to the intaglio dot pattern on the surface of the transfer roller to either one of the foam 10 and the fabric 30;

a fourth process of bonding by compressing the foam 10 and the fabric 30; and a fifth process of cutting the shape of the shoe insole in the package in which the foam 10 and the fabric 30 are bonding.

As shown in FIGS. 3 and 4, the present invention is because the adhesive resin 20 applied among the transfer roller surfaces is removed by a scraper except for the intaglio dot pattern. The adhesive resin 20 is partially applied only to the shoe insole-shaped portion of the transfer roller surface, in which the engraved dot pattern is formed in a mesh-type, and transferred to one of the foam 10 and the fabric 20.

When the package in which the foam 10 and the fabric 30 are bonded is cut into a shoe insole shape, as shown in FIG. 6, a scrap generated by the conventional all-over bonded or all sides bonding method cannot separate the foam 10 and the fabric 30, which are bonded with the adhesive resin 20.

However, a dot bonding method according to aspect(s) of the present invention, the scraps generated due to a state where the adhesive resin 20 is not applied to the other portions of the foam 10 and the fabric 30, can be easily separated with a foam and a fabric, and then recycled.

As shown in FIG. 6, 35 to 40% of scrap can be recycled and used for an eco-friendly purpose, which is completely discarded after manufacturing a shoe insole by a conventional hot-melt film or a whole side bonding method using an adhesive.

An overflow phenomenon can be prevented by applying the adhesive resin 20 with the hydrophobic nano-silica surface-modified nano-silica in a dot pattern using a transfer roller and bonding the foam 10 and the fabric 30. In addition, it is possible to reduce the weight and material cost of the product while achieving a soft touch.

In the following, a method of manufacturing an adhesive resin containing nano-silica containing a hydrophobic functional group on a surface is described in detail.

That is, a method for preparing a TPU adhesive resin by mixing hydrophobic nano-silica with a raw material such as isocyanate, polyol, and glycol used for TPU polymerization and polymerizing it, and a method of manufacturing an adhesive resin by making a masterbatch using hydrophobic nano-silica and mixing it by content in TPU resin or EVA resin will be described in detail.

Example 1

The manufacturing method of the adhesive resin according to the present invention is a method of manufacturing by mixing a raw material used for polymerization of TPU pellets and polymerizing it, may include following four steps.

Step 1: Hydrophobic nano-silica particles having a primary particle size of about 20 nm and having a dimethyl group as a hydrophobic functional group on the surface were prepared by treating nano-silica of 100 nm or less with dimethyl dichloro silane.

Step 2: A raw material for conventional TPU pellet polymerization is prepared. Specifically, polyol, isocyanate, and short chain glycol are prepared.

Step 3: Select any one of the raw materials suggested in the above step 2 and introduce the selected raw material into hydrophobic nano-silica or add all the combination of raw materials into the hydrophobic nano-silica and knead them.

At this time, the temperature is 80~100° C. and the stirring speed is preferably about 20~30 rpm.

Step 4: the raw material is sufficiently kneaded with hydrophobic nano-silica in the step 3, the remaining raw materials are simultaneously put into a reactive extruder, or the raw materials sufficiently kneaded with hydrophobic nano-silica are simultaneously put into a reactive extruder to polymerize them into TPU pellets.

Example 2

The adhesive resin according to the present invention is a method for preparing an adhesive resin by mixing the content with TPU resin or EVA resin by making a masterbatch using hydrophobic nano-silica, may include the following three steps.

The first step is to measure the resin suggested above by content. At this time, it is preferable to consider the dispersibility and the like so that the content of the hydrophobic nano-silica does not exceed a maximum of 40%.

In the second step, the hydrophobic nano-silica and the resin are introduced into a conventional kneader, kneaded at a temperature of 100 to 120° C. at a rate of 20 to 30 rpm, cooled, then pulverized to a diameter of less than 10 mm, and then input to the conventional twin extruder again.

At this time, the temperature of the twin-screw extruder is maintained in a range of 150~200° C.

In the third step, when the resin is compounded in the twin screw extruder is made into a pellet form while being injected into cooling water at 15 to 20° C., it becomes a master batch to be obtained in an aspect of the present invention. The master batch is mixed with TPU resin (or EVA resin) by content to prepare an adhesive resin.

Example 3

The method of bonding the foam and the fabric using the transfer roller according to an aspect of the present invention, may include the following four steps.

Step 1: The adhesive resin suggested above, preferably TPU or EVA resin, is melted by an extruder or a drum type melting device and then transferred to a transfer roller.

Step 2: Apply the adhesive resin to the surface of the transfer roller in which the intaglio dot pattern is formed in a mesh shape in the shape of the shoe insole.

Step 3: Remove the adhesive resin applied to the surface of the transfer roller other than the intaglio dot pattern using a conventional scrape.

Step 4: After transferring the adhesive resin applied to the intaglio dot pattern on the surface of the transfer roller to one side of the foam and compressing the other adherend, the fabric, using a pressing roller, then bond the foam and the fabric after the cooling process.

In the present invention, in implementing the foam/fabric bonding method as described above, the conditions in the bonding process for each adhesive resin containing nano-silica are specifically shown in Table 1 below.

TABLE 1

| Bonding Condition | Unit | TPU | EVA |
|---|---|---|---|
| Temperature of resin melting compressor | ° C. | 130~200 | 130~200 |
| Temperature of transfer roller | ° C. | 120~180 | 110~180 |
| Rotation speed of transfer roller | m/min | 3~7 | 3~7 |
| Temperature of Compression roller | ° C. | 90~150 | 90~150 |
| Pressure of Compression roller | kg f | 4~8 | 4~8 |

The compression roller presented in Table 1 refers to a roller for bonding the molten resin foam and fabric with heat and pressure.

The adhesive conditions may vary depending on the properties of the adhesive resin and may also vary depending on the type of adherend (foam or fabric).

As described above, the present invention may prevent the adhesive resin from being sucked into the side where the density of the foam or fabric is low or where the size of the fabric weaving hole is small at the time of dot bonding by using an adhesive resin mixing hydrophobic nano-silica, so that even with a small application amount sufficient adhesion can be achieved.

In the past, in order to increase the coating amount of the adhesive resin, the intaglio depth of the transfer roller was required to be made deeper to apply more adhesive resin, however, there was a difficulty in applying adhesive resin with a thickness of 50 μm or more.

Like aspect(s) of the present invention, the adhesive resin in which the hydrophobic nano-silica is mixed has a sufficient adhesion strength even with a small application amount, and as the application amount decreases, the intaglio depth of the transfer roller can be lowered, thereby improving workability at the time of bonding and adhesion. Since the adhesive force is expressed by selectively applying only the necessary parts, the effect of cost reduction is very large. It can improve the soft texture of the fabric and help to reduce the weight of the product.

Experimental Example

In order to prove the effect of the hydrophobic nano-silica prepared in Example 1 on the adhesive resin, the experimental results for the adhesion test will be described in detail.

In Table 2 below, to compare the adhesive strength between the foam and the fabric according to the intaglio depth of the transfer roller, i.e., a thickness of the adhesive resin, under the condition of a fine dot size is about 0.15 mm in a width and a length respectively, and the transfer area of the adhesive resin was formed about 40% based on the total surface area, the foam/fabric package was manufactured at a temperature of 130° C. and 5 m/min.

Below ① and ② show the average measured on the basis of the conventional adhesive resin and ③ and ④ on the basis of the adhesive resin mixed with 1 phr hydrophobic nano-silica.

TABLE 2

| Thickness Adhesive of resin (μm) | ① conventional TPU adhesive resin (kg f/cm²) | ② conventional EVA adhesive resin (kg f/cm²) | ③ Hydrophobicity N.S. TPU adhesive resin (kg f/cm²) | ④ Hydrophobicity N.S. EVA adhesive resin (kg f/cm²) |
|---|---|---|---|---|
| 10 | 0.21 | 0.12 | 0.33 | 0.23 |
| 20 | 0.35 | 0.20 | 0.64 | 0.39 |
| 30 | 0.42 | 0.33 | Foam destruction | 0.48 |
| 40 | 0.55 | 0.42 | Foam destruction | Foam destruction |

As shown in Table 2, the dot bonding method according to the present invention shows much stronger adhesive strength than a conventional adhesive resin even with a small application amount.

Furthermore, as a result of performing an adhesive strength test on the adhesive resin containing hydrophobic nano-silica by content, When the content of the hydrophobic nano-silica was less than 0.2 phr, the adhesive strength was somewhat unstable, but it was confirmed that the adhesive strength was improved compared to the conventional adhesive resin.

However, when the content of the hydrophobic nano-silica is 3 phr, it was confirmed that the adhesive strength was slightly lowered as the content of the nano-silica was increased.

As a result of increasing the content, up to 5 phr, the adhesive strength was slightly decreased, but there was no problem in the adhesive strength.

However, when the content of the hydrophobic nano-silica exceeds 5 phr, there is a problem in that the adhesive strength was decreased and a blooming phenomenon was occurred.

Therefore, according to aspect(s) of the present invention, it was confirmed through experiments that an object and/or an effect of the present invention can be realized if the dots transferred by applying an adhesive resin having a hydrophobic nano-silica content of 0.2 to 5.0 phr as a mesh shape on one side of the adherend, a dot in thickness (height) in a range of 10~40/μM, width/length in a range of 0.05~0.3 mm, a space between dots 0.05~0.15 mm, and the transfer region of the adhesive resin is within a range of 20 to 60% based on the total surface area.

In the past, it reacts sensitively to heat and pressure during the press operation (No-Sew Press) according to the nature of various adhesive resins, so that the flow rate is rapidly increased. It does not remain at the adhesive interface depending on the fabric structure, so it penetrates too much between the fabrics and the adhesion performance does not come out well.

In order to overcome the mentioned drawback, by mixing nano-silica, especially hydrophobic nano-silica, the adhesive force is improved even at a thin thickness by keeping a certain amount of adhesive resin at the adhesive interface according to aspect(s) of the present invention.

The adhesive resin used in the present invention may increase the internal chemical bonding and van der Waals bond of the hydrophobic nano-silica polyurethane (TPU) or ethylene vinyl acetate (EVA) resin.

Consequently, Rheology properties and cohesion are increased to increase the strength of the adhesion, so eventually it is possible to structurally increases the adhesion.

By applying the adhesive resin containing hydrophobic nano-silica in a dot-bonding manner, compared to the conventional adhesive resin or hot melt film, it can realize the same adhesive performance with a thinner thickness, thereby reducing the cost. In addition, can improve the overflow phenomenon of adhesive resin during the process of bonding, and also have many advantages such as excellent softness of shoe insoles with foam and fabric, and lighter weight of products.

As described above, in the case of a foam/fabric package manufactured by a conventional hot melt film or a frontal bonding method using a liquid adhesive, it is difficult to separate large quantities of scraps from different materials (foams and fabrics) after manufacturing the shoe insole between adherents (foam and fabric), the problem of disposal is improved.

In the dot bonded foam/fabric package according to the present invention, only a portion is bonded that needs to be adhered using the transfer rollers shown in FIGS. 3 and 4. Since only the shoe insole shape is bonded and the rest of the shoe is not bonded, scraps generated after manufacturing the shoe insole can be easily separated into respective foams and fabrics.

The material obtained can be recycled, thereby be eco-friendly and be cost effective.

The scope of this invention is not limited to the shoe manufactured by dot bonding the foam and fabric shown above, it is possible to replace, modify and change in various forms without departing from the technical spirit of the present invention. The present invention uses a dot-bonding method using an adhesive resin in which hydrophobic nano-silica is mixed, as well as in the field of fabrics required for various shoes, clothes, bags, etc. requiring uniform adhesion and durability. In addition, sports goods or life such as leather and plastic products can be used for various purposes such as supplies and industrial products.

EXPLAINS OF SYMBOLS

10: foam
20: adhesive resin
30: fabric
100: shoe insole

What is claimed is:

1. A method for manufacturing a dot bonding shoe insole using an adhesive resin containing hydrophobic nano-silica, the method comprising:
    melting adhesive resin, the adhesive resin comprising a resin selected from the group consisting of thermoplastic polyurethane (TPU) and ethylene vinyl acetate (EVA), the adhesive resin further comprising hydrophobic nano-silica in a range of 0.2 to 5 phr;
    applying the adhesive resin to a surface of a transfer roller in which an intaglio dot pattern is formed in a shoe insole shape such that the adhesive resin is applied to the surface of the transfer roller with the intaglio dot pattern;
    removing adhesive resin applied to an area which is not part of the intaglio dot pattern using a scraper;
    transferring the adhesive resin applied to the intaglio dot pattern of the surface of the transfer roller to either one of a foam or a fabric, thereby forming a dot pattern adhesive resin layer on a surface of the foam or the fabric;
    bonding the foam and the fabric by compressing; and
    cutting the bonded foam and fabric formed by the bonding step out in the shoe insole shape, thereby forming the dot bonding shoe insole,
    wherein the hydrophobic nano-silica forms aggregates of the hydrophobic nano-silica having an average nano-silica aggregation size of about 100 to about 1200 nm in the dot pattern adhesive resin layer on the surface of the foam or the fabric.

2. The method of claim 1, wherein the hydrophobic nano-silica has a primary particle size of about 1 to about 100 nm.

3. The method of claim 1, wherein the hydrophobic nano-silica contains any one or more hydrophobic functional groups selected from the group consisting of alkyl, dimethyl, trimethyl, dimethyl siloxane, and methacryl groups on the surface of nano-silica particles of the hydrophobic nano-silica.

4. The method of claim 1, wherein the dot pattern adhesive resin layer is in a form of a plurality of dots, each of the plurality of dots has a thickness and a height, each in a range of 10 to 40 μm, and a width and a length, each in a range of 0.05 to 0.3 mm, and an interval between adjacent dots of the plurality of dots is in a range of 0.05 to 0.15 mm.

5. The method of claim 1, wherein the dot pattern adhesive resin layer, formed on the surface of the foam or the fabric has an area in a range of 20 to 60% based on a total surface area of the dot bonding shoe insole.

6. The method of claim 1, wherein the dot pattern adhesive resin layer on the foam or the fabric is sandwiched between the foam and the fabric for bonding the foam and the fabric.

7. A method for manufacturing a dot bonding shoe insole using an adhesive resin containing hydrophobic nano-silica, the method consisting essentially of:
    melting adhesive resin, the adhesive resin comprising a resin selected from the group consisting of thermoplastic polyurethane (TPU) and ethylene vinyl acetate (EVA), the adhesive resin further comprising hydrophobic nano-silica in a range of 0.2 to 5 phr;
    applying the adhesive resin to a surface of a transfer roller in which an intaglio dot pattern is formed in a shoe insole shape such that the adhesive resin is applied to the surface of the transfer roller;
    removing adhesive resin applied to an area which is not part of the intaglio dot pattern using a scraper;
    transferring adhesive resin applied to the intaglio dot pattern of the surface of the transfer roller to either one of a foam or a fabric, thereby forming a dot pattern adhesive resin layer on a surface of the foam or the fabric;
    bonding the foam and the fabric by compressing; and
    cutting the bonded foam and fabric formed by the bonding step out in the shoe insole shape, thereby forming the dot bonding shoe insole,
    wherein the hydrophobic nano-silica forms aggregates of the hydrophobic nano-silica having an average nano-silica aggregation size of about 100 to about 1200 nm in the dot pattern adhesive resin layer on the surface of the foam or the fabric.

* * * * *